United States Patent
Noboa

(10) Patent No.: US 10,528,016 B2
(45) Date of Patent: Jan. 7, 2020

(54) BUILDING MANAGEMENT SYSTEM WITH AUTOMATIC REMOTE SERVER QUERY FOR HANDS FREE COMMISSIONING AND CONFIGURATION

(71) Applicant: Johnson Controls Technology Company, Plymouth, MI (US)

(72) Inventor: Homero L. Noboa, Waukesha, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 38 days.

(21) Appl. No.: 15/591,952

(22) Filed: May 10, 2017

(65) Prior Publication Data

US 2018/0224819 A1 Aug. 9, 2018

Related U.S. Application Data

(60) Provisional application No. 62/456,080, filed on Feb. 7, 2017.

(51) Int. Cl.
*G05B 19/042* (2006.01)
*F24F 11/30* (2018.01)
(Continued)

(52) U.S. Cl.
CPC .......... *G05B 19/0423* (2013.01); *F24F 11/30* (2018.01); *F24F 11/32* (2018.01);
(Continued)

(58) Field of Classification Search
CPC ............. H04L 12/2803; H04L 12/2809; H04L 12/2818; H04L 12/2825; H04L 41/024;
(Continued)

(56) References Cited

U.S. PATENT DOCUMENTS 6,199,133 B1 * 3/2001 Schnell ................... H04L 41/24
709/208
7,783,977 B2 * 8/2010 Stadheim ............. F24F 11/0009
715/212

(Continued)

OTHER PUBLICATIONS

U.S. Appl. No. 15/008,329, filed Jan. 27, 2016, Johnson Controls Technology Company.

(Continued)

*Primary Examiner* — Crystal J Barnes-Bullock
(74) *Attorney, Agent, or Firm* — Foley & Lardner LLP

(57) ABSTRACT

A building management system includes a communications bus, slave devices connected to the communications bus, a remote server that includes a slave device configuration database, and a master controller connected to the communications bus. The master controller is configured to query the slave devices for device identification codes, receive device identification codes from the slave devices, and connect to the remote server. The master controller is further configured to transmit device identification codes to the slave device configuration database, receive slave device configuration information from the slave device configuration database, and control the slave devices based on the slave device configuration information.

18 Claims, 11 Drawing Sheets

(51) Int. Cl.

| | |
|---|---|
| *F24F 11/89* | (2018.01) |
| *F24F 11/32* | (2018.01) |
| *F24F 11/62* | (2018.01) |
| *F24F 11/56* | (2018.01) |
| *F24F 11/54* | (2018.01) |
| *F24F 11/64* | (2018.01) |
| *F24F 11/46* | (2018.01) |
| *F24F 110/00* | (2018.01) |

(52) U.S. Cl.
CPC .............. *F24F 11/62* (2018.01); *F24F 11/89* (2018.01); *F24F 11/46* (2018.01); *F24F 11/54* (2018.01); *F24F 11/56* (2018.01); *F24F 11/64* (2018.01); *F24F 2110/00* (2018.01); *G05B 2219/2231* (2013.01); *G05B 2219/2614* (2013.01); *G05B 2219/2642* (2013.01)

(58) Field of Classification Search
CPC . H04L 41/24; H04L 41/67125; H04L 67/125; F24F 11/30; F24F 11/47; F24F 11/58; F24F 2140/60; F24F 11/52; F24F 11/56; F24F 11/64; G05B 13/02; G05B 15/02; G05B 19/042; G05B 2219/2614; G05B 2219/2642; G05B 2219/25011; G06Q 10/06; G06Q 50/06; G06F 13/10; Y02D 10/14

See application file for complete search history.

(56) References Cited

U.S. PATENT DOCUMENTS

| | | | |
|---|---|---|---|
| 9,021,462 B2 | 4/2015 | Gupta | |
| 9,111,240 B2 * | 8/2015 | Petite | H04B 1/3827 |
| 9,425,978 B2 * | 8/2016 | Frei | H04L 29/1249 |
| 9,518,838 B2 * | 12/2016 | Yamamoto | H04Q 9/00 |
| 9,732,977 B2 * | 8/2017 | Alexander | F24F 11/006 |
| 9,733,630 B2 * | 8/2017 | Ditlow | G05B 15/02 |
| 2003/0040932 A1 * | 2/2003 | Sato | G07C 9/00031 340/541 |
| 2007/0190924 A1 * | 8/2007 | Stadheim | F24F 11/30 454/225 |
| 2015/0035682 A1 * | 2/2015 | Sasaki | H04M 11/002 340/870.02 |
| 2015/0227870 A1 * | 8/2015 | Noboa | G06Q 10/0635 705/7.28 |
| 2016/0124400 A1 * | 5/2016 | Kanayama | G05B 13/02 307/116 |
| 2016/0294446 A1 * | 10/2016 | Rumler | G05B 15/02 |
| 2016/0366010 A1 | 12/2016 | Hamber et al. | |
| 2016/0377309 A1 * | 12/2016 | Abiprojo | F24F 11/0086 700/276 |
| 2018/0087790 A1 * | 3/2018 | Perez | F24F 11/56 |
| 2018/0088547 A1 * | 3/2018 | Perez | F24F 11/30 |
| 2018/0218540 A1 * | 8/2018 | Sridharan | G06T 19/006 |
| 2018/0224144 A1 * | 8/2018 | Noboa | F24F 11/30 |
| 2018/0225244 A1 * | 8/2018 | Dorneanu | G06F 13/374 |

OTHER PUBLICATIONS

U.S. Appl. No. 15/179,894, filed Jun. 10, 2016, Johnson Controls Technology Company.

U.S. Appl. No. 15/261,843, filed Sep. 9, 2016, Johnson Controls Technology Company.

\* cited by examiner

| Parameter | Chiller 1 | Chiller 2 | Chiller 3 | Chiller 4 |
|---|---|---|---|---|
| Peak_COP | | | | |
| Motor_VS | | | | |
| Rated_Power | | | | |
| Rated_CW_Flow | | | | |
| Rated_CHW_Flow | | | | |
| CW_Min_Flow | | | | |
| CHW_Min_Flow | | | | |
| CHW_Max_Flow | | | | |
| Rated_Capacity | | | | |
| Chiller_Max_Uprated_Capacity | | | | |
| Design_Lift | | | | |
| Design_Lift_Sensitivity | | | | |
| Min_Percent_Load | | | | |
| Max_Percent_Load | | | | |
| Min_Percent_Load_COP | | | | |
| Max_Percent_Load_COP | | | | |
| Lift_High_Range | | | | |
| Lift_Low_Range | | | | |
| Number_Of_Passes | | | | |
| Number_Of_Tubes | | | | |
| Shell_Length | | | | |
| Tube_Inside_Diameter | | | | |
| FRx_Tube_Coefficient | | | | |
| Fry_Tube_Coefficient | | | | |
| Fluid_Type | | | | |
| Concentration | | | | |

| Parameter | Tower 1 | Tower 2 | Tower 3 | Tower 4 |
|---|---|---|---|---|
| Rated_Water_Flow_Capacity | | | | |
| Rated_Power | | | | |
| Rated_Fan_Capacity | | | | |
| Rated_Fan_Speed | | | | |

| Parameter | CW Pump 1 | CW Pump 2 | CW Pump 3 | CW Pump 4 |
|---|---|---|---|---|
| Rated_Capacity | | | | |
| Rated_Power | | | | |
| Rated_Speed | | | | |

| Parameter | AHU |
|---|---|
| Rated AHU Capacity | |
| Rated Compressor Power | |
| Rated AHU Fan Capacity | |
| Rated AHU Fan Power | |
| Design Supply Air Temperature | |
| Design Supply Air Flow | |
| Rated AHU Airflow Pressure Drop | |
| Rated Condenser Fan Capacity | |
| Rated Condenser Fan Power | |

FIG. 11

BUILDING MANAGEMENT SYSTEM WITH AUTOMATIC REMOTE SERVER QUERY FOR HANDS FREE COMMISSIONING AND CONFIGURATION

CROSS-REFERENCE TO RELATED PATENT APPLICATION

This application claims the benefit of and priority to U.S. Provisional Patent Application No. 62/456,080 filed Feb. 7, 2017, the entire disclosure of which is incorporated by reference herein.

BACKGROUND

The present disclosure relates generally to the field of heating, ventilation, and air conditioning (HVAC) control systems. The present disclosure relates more particularly to systems and methods for automatic commissioning and configuration of controllers and devices in an HVAC control system.

HVAC control systems are used to monitor and control temperature, humidity, air flow, air quality, and/or other conditions within a building or building system. HVAC control systems typically include a plurality of measurement devices (e.g., temperature sensors, pressure sensors, flow sensors, etc.), control devices (e.g., chillers, boilers, air handling units, variable air volume units, etc.), and a controller for receiving feedback from the measurement devices and providing a control signal to the control devices. Some HVAC control systems include a main controller and one or more auxiliary, or subordinate, controllers.

Current methods of manually configuring the operational device parameters in a network of HVAC devices require considerable resources and effort. Manual configuration is also prone to human error, which may result in system errors that are difficult to diagnose and remedy. When manual configuration is not available or cost-effective, default parameters are often utilized, which may not accurately define the operating characteristics of the controlled devices. A configuration system and method for HVAC devices that avoids both manual and default value configuration would be useful.

SUMMARY

One implementation of the present disclosure is a building management system. The building management system includes a communications bus, slave devices connected to the communications bus, remote server including a slave device configuration database, and a master controller connected to the communications bus. The master controller is configured to query the slave devices for device identification codes, receive device identification codes from the slave devices, and connect to the remote server. The master controller is further configured to transmit device identification codes to the slave device configuration database, receive slave device configuration information from the slave device configuration database, and control the slave devices based on the slave device configuration information.

In some embodiments, the device identification codes include at least one of a device serial number, a device model number, a device MAC address, a device product number, device identification dip switches and a device ID number. In some embodiments, the slave devices include at least one of a chiller device and a field controller.

In some embodiments, the master controller is further configured to write slave device configuration information to non-volatile memory.

In some embodiments, slave device configuration information includes at least one of cooling tower configuration parameters, chilled water pump configuration parameters, condenser water pump configuration parameters, air handling unit configuration parameters, rooftop air handing unit configuration parameters, and variable air volume unit configuration parameters. In other embodiments, slave device configuration information includes at least one of a rated device capacity, a rated device power, and a rated device speed.

In some embodiments, slave device configuration information includes chiller device configuration parameters. In other embodiments, chiller device configuration parameters include at least one of a rated device power, a rated chilled water flow, a rated condenser water flow, a maximum chilled water flow, a minimum chilled water flow, a maximum condenser water flow, a minimum condenser water flow, and a fluid type.

In some embodiments, the master controller is further configured to determine whether slave device configuration information has been received for each of the slave devices and to transmit a completion message to a commissioning agent.

Another implementation of the present disclosure is a method for commissioning a plurality of slave devices by a master controller in a building management system. The method includes querying the slave devices connected to a communications bus of the building management system, receiving device identification codes from the slave devices, and connecting to a remote server. The remote server includes a slave device configuration database. The method further includes transmitting device identification codes to the slave device configuration database, receiving slave device configuration information from the slave device configuration database, and controlling the slave devices based on the slave device configuration information.

In some embodiments, the device identification codes include at least one of a device serial number, a device model number, a device MAC address, a device product number, device identification dip switches and a device ID number.

In some embodiments, the slave devices include at least one of a chiller device and a field controller.

In some embodiments, the method further includes writing slave device configuration information to non-volatile memory.

In some embodiments, slave device configuration information includes at least one of cooling tower configuration parameters, chilled water pump configuration parameters, condenser water pump configuration parameters, air handling unit configuration parameters, rooftop air handling unit configuration parameters, and variable air volume unit configuration parameters. In other embodiments, slave device configuration information includes at least one of a rated device capacity, a rated device power, and a rated device speed.

In some embodiments, slave device configuration information includes chiller device configuration parameters. In other embodiments, chiller device configuration parameters include at least one of a rated device power, a rated chilled water flow, a rated condenser water flow, a maximum chilled water flow, a minimum chilled water flow, a maximum condenser water flow, a minimum condenser water flow, and a fluid type.

In some embodiments, the method further includes determining whether slave device configuration information has been received for each of the slave devices and transmitting a completion message to a commissioning agent.

Another implementation of the present disclosure is a method for commissioning HVAC devices in a building management system. The method includes querying designated slave devices connected to a communications bus of the building management system, receiving device identification codes from the designated slave devices. The device identification codes include at least one of a serial number, a model number, a MAC address, a product number, identification dip switches, and an ID number. The method further includes connecting to a remote database including device configuration parameters, transmitting the device identification codes to the remote database, receiving device configuration parameters from the remote database corresponding to the device identification codes, and configuring the designated slave devices using the device configuration parameters.

In some embodiments, each designated slave device includes non-volatile memory and wherein configuring the designated slave devices using the device configuration parameters includes writing the device configuration parameters to the non-volatile memory.

BRIEF DESCRIPTION OF THE DRAWINGS

FIG. 8 is a table illustrating the configuration parameters of chiller devices implemented in the central plant optimization systems of FIGS. 5-6, according to some embodiments.

FIG. 9 is a table illustrating the configuration parameters of cooling towers implemented the central plant optimization systems of FIGS. 5-6, according to some embodiments.

FIG. 10 is a table illustrating the configuration parameters of chilled water pumps implemented in the central plant optimization systems of FIGS. 5-6, according to some embodiments.

FIG. 11 is a table illustrating the configuration parameters of an air handling unit (AHU) implemented in the central plant optimization systems of FIGS. 5-6, according to some embodiments.

DETAILED DESCRIPTION

Before turning to the FIGURES, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Overview

Referring generally to the FIGURES, an automatic remote server query system for hands free commissioning and configuration of HVAC devices is shown, according to some embodiments. The HVAC devices may operate within a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS described herein provides a system architecture to automatically commission and configure HVAC devices without manual entry of configuration parameters or the use of default configuration values. The system may include a database hosted in a secure web server that is populated with configuration information for a variety of different HVAC devices. The individual configuration parameters may be stored according to a unique device identification code. A master controller within the system may query all other HVAC devices in the system for their device identification codes. Once received, the master controller may connect to the secure database and transmit a query including the device identification codes. The database may respond to the query with the pertinent configuration information for each of the devices corresponding to the device identification codes. Using the configuration information received from the database, the master controller may configure and control the HVAC devices.

Building Management System and HVAC System

Figure 1:
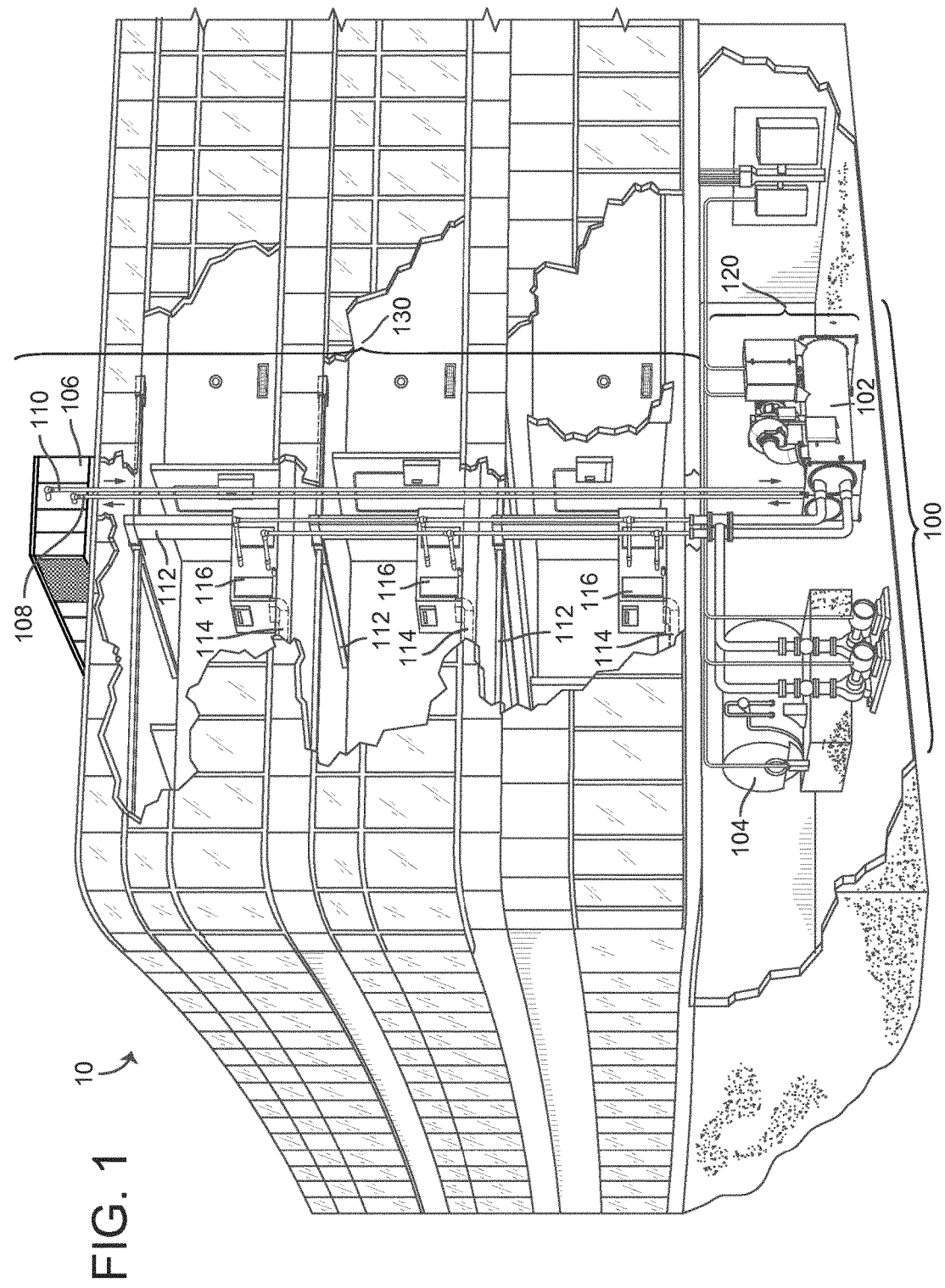
FIG. 1 is a drawing of a building equipped with a heating, ventilating, and air conditioning (HVAC) system, according to some embodiments.

Referring now to FIGS. 1-4, an exemplary building management system (BMS) and HVAC system in which the systems and methods of the present invention can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
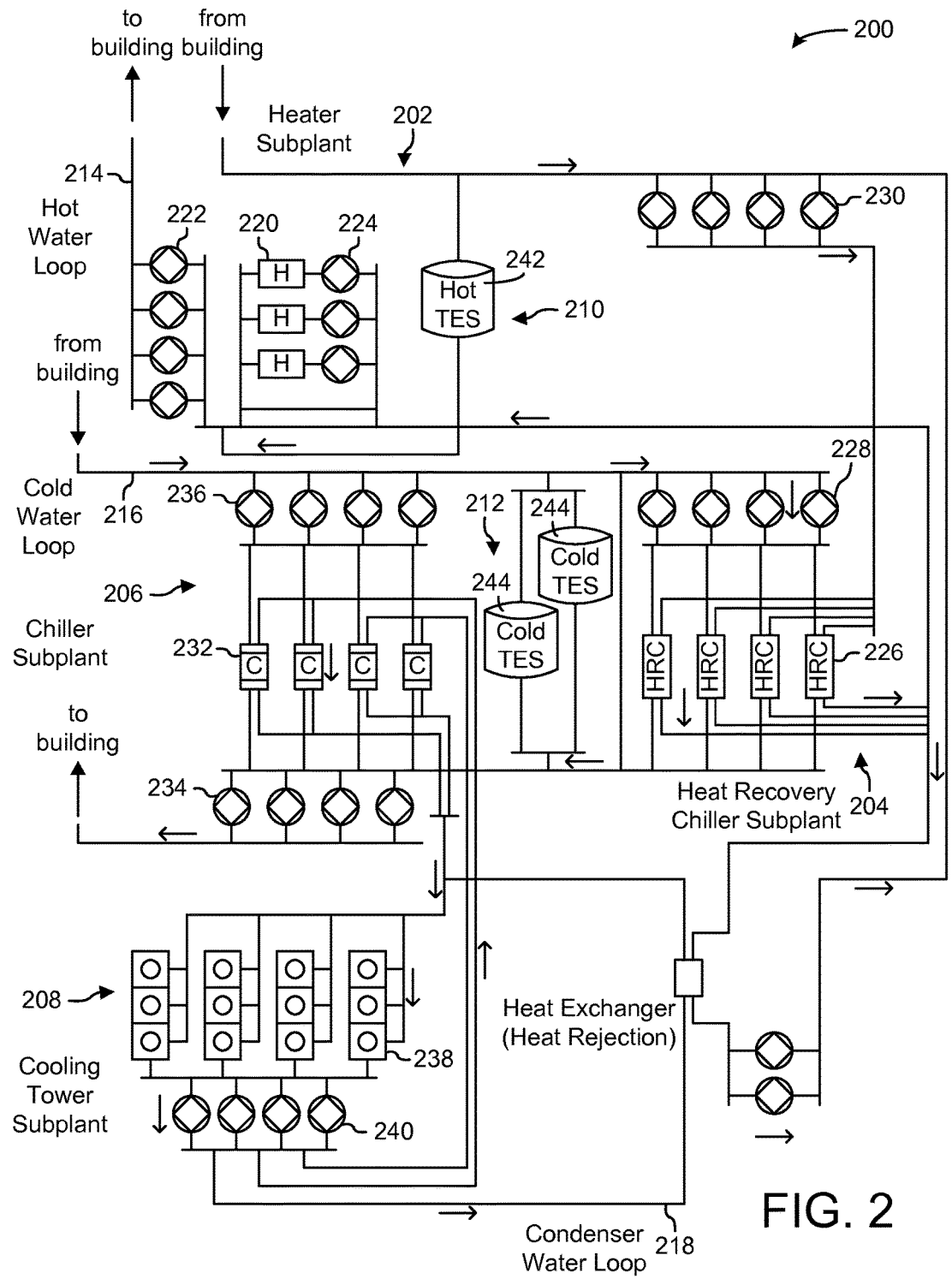
FIG. 2 is a block diagram of a building management system (BMS) which can be used to monitor and control the building and HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
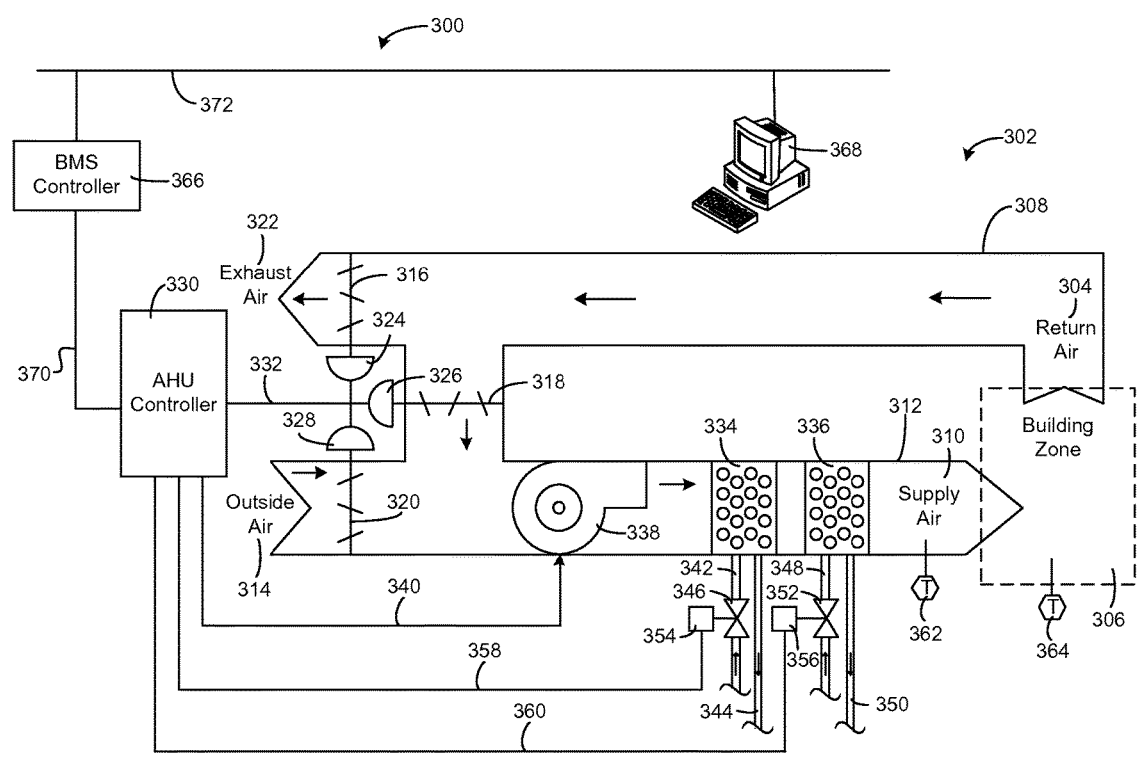
FIG. 3 is a block diagram illustrating the BMS of FIG. 2 in greater detail, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
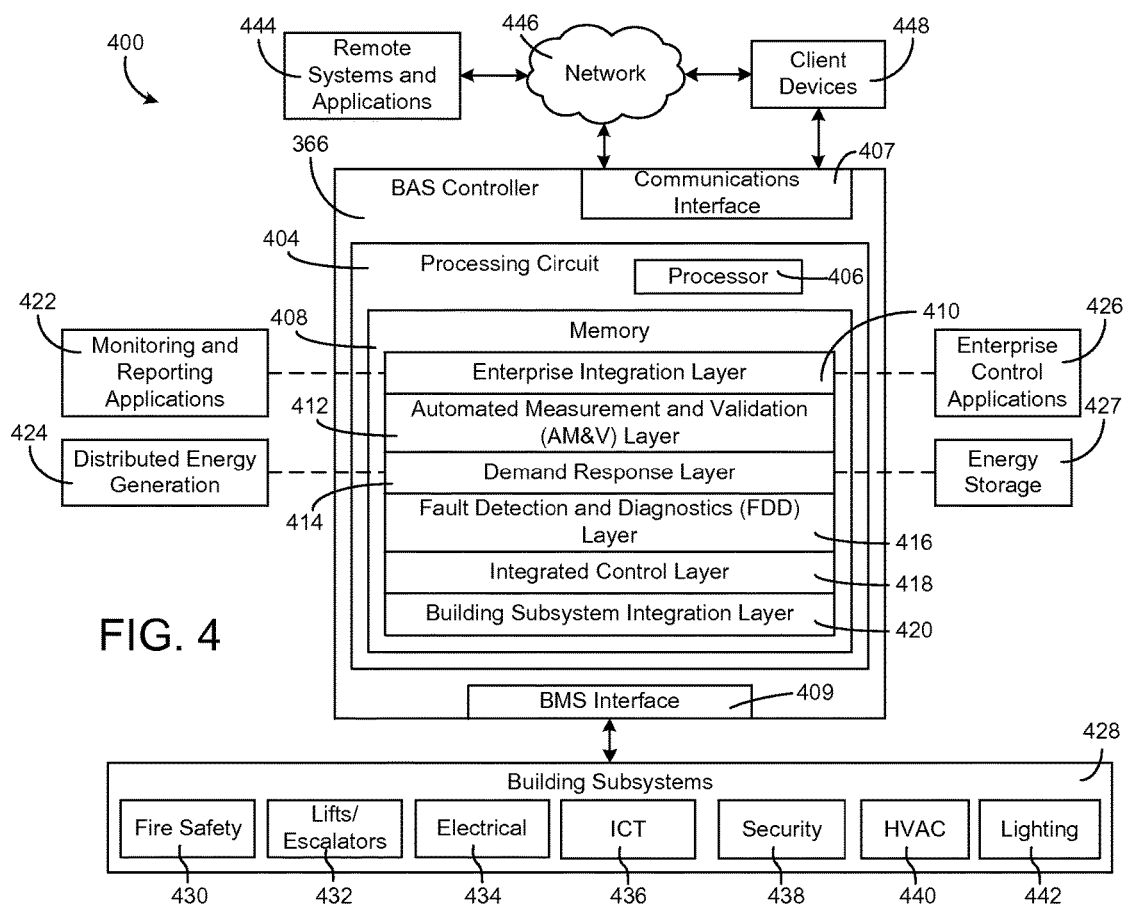
FIG. 4 is a is a block diagram of a BMS that can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Automatic Remote Server Query Commissioning

Figure 5A:
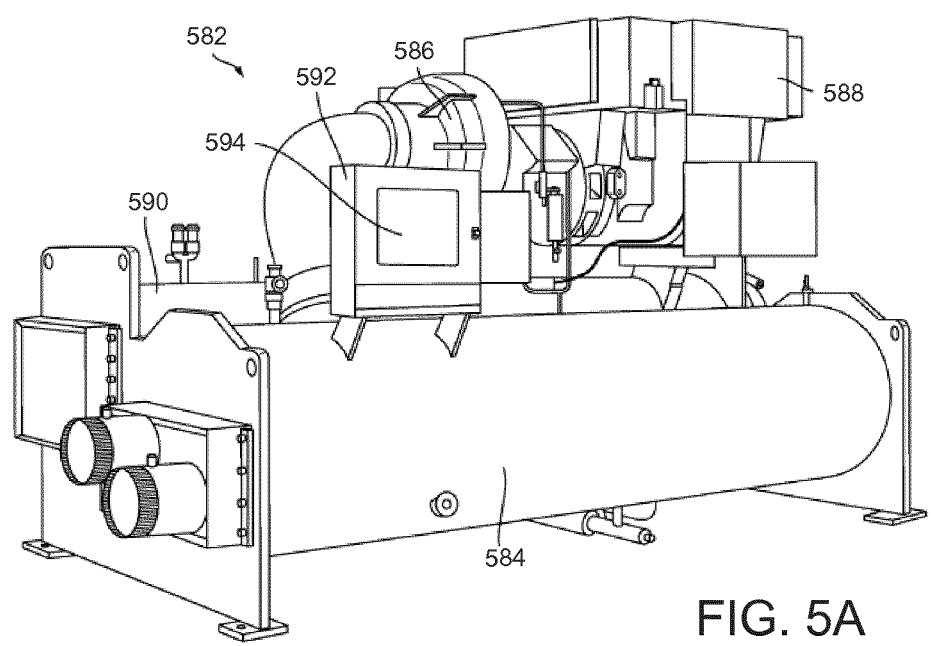
FIG. 5A is a depiction of a chiller assembly that can be implemented in the HVAC system of FIG. 1, according to some embodiments.

Referring now to FIG. 5A, a chiller 582 is depicted. Chiller 582 is shown to include evaporator 584, which provides a heat exchange between the fluid returned from the HVAC system and another fluid, such as a refrigerant. The refrigerant in evaporator 584 of chiller 582 may remove heat from the chilled fluid during the evaporation process, thereby cooling the chilled fluid. The refrigerant may absorb heat from the chilled fluid and change from a boiling liquid and vapor state to vapor inside evaporator 584. The chilled fluid may then be circulated back to an air handling unit via piping, as illustrated in FIG. 1, for subsequent heat exchange with the load.

Suction may cause the refrigerant vapor to flow from evaporator 584 into compressor 586 of chiller 582. Compressor 586 may include a rotating impeller (or another compressor mechanism such as a screw compressor, reciprocating compressor, centrifugal compressor, etc.) that increases the pressure and temperature of the refrigerant vapor and discharges it into condenser 590. The impeller may be driven by motor 588, which may have a variable speed drive (e.g., variable frequency drive). The variable speed drive may control the speed of the motor 588 by varying the AC waveform provided to the motor. The impeller may further include or be coupled to an actuator that controls the position of pre-rotation vanes at the entrance to the impeller of compressor 586.

The discharge from compressor 586 may pass through a discharge baffle into condenser 590 and through a subcooler, controllably reducing the discharge back into liquid form. The liquid may then pass through a flow control orifice and through an oil cooler to return to evaporator 584 to complete the cycle. In the embodiment shown in FIG. 5, the chiller 582 further includes a controller 592 coupled to an electronic display 594 (e.g., a touch screen) at which settings for the chiller 582 (e.g., the speed of motor 588, the angle of the pre-rotation vanes) may be adjusted to vary the flow of refrigerant through the chiller 582. As described in further detail below, electronic display 594 may also display information related to the central plan optimization system.

Figure 5B:
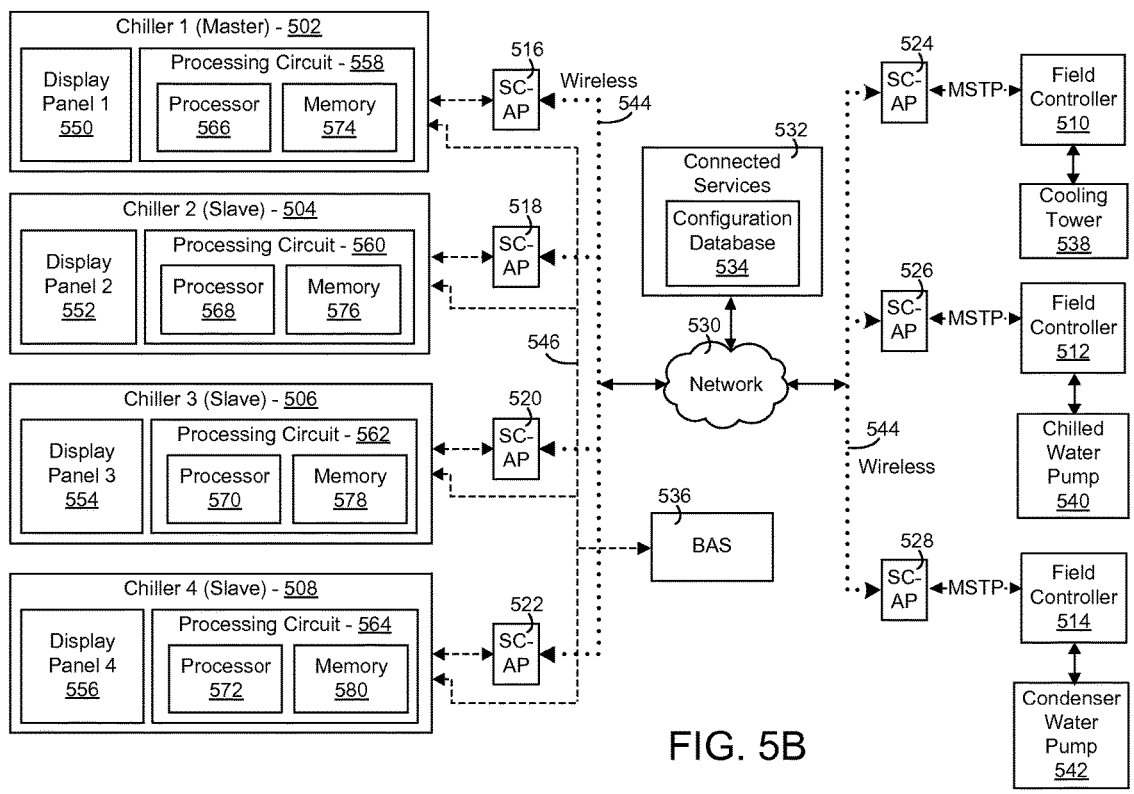
FIG. 5B is a block diagram of a central plant optimization system that can be implemented in the HVAC system of FIG. 1, according to some embodiments.

Turning now to FIG. 5, a central plant optimization system (CPOS) 500 is depicted. In various embodiments, system 500 may comprise a subsystem or component of HVAC system 100. CPOS 500 is shown to include multiple chillers (e.g., chiller 502, chiller 504, chiller 506, and chiller 508). In some embodiments, chillers 502-508 are identical or substantially similar to chiller 582, described above with reference to FIG. 5A. Chillers 502-508 are shown to be communicably coupled to BAS 536 via network 546. In some embodiments, BAS 536 is identical or substantially similar to BAS controller 366 described above with reference to FIG. 4. For example, according to an exemplary embodiment, BAS 536 is a METASYS® brand building automation system, as sold by Johnson Controls, Inc. In some embodiments, chillers 502-508 may communicate with BAS 526 via a BACnet communications protocol.

CPOS 500 is further shown to include one or more cooling towers (e.g., cooling tower 538), one or more chilled water pumps (e.g., chilled water pump 540), and one or more condenser water pumps (e.g., condenser water pump 542). In some embodiments, these devices may be identical or substantially similar to devices described above with reference to FIG. 2. For example, cooling tower 508 may be identical or substantially similar to cooling tower subplant 208, chilled water pump 540 may be identical or substantially similar to chilled water pumps 234-236, and condenser water pump 542 may be identical or substantially similar to condenser water pumps 240. In various embodiments, any or all of cooling tower 538, chilled water pump 540, and condenser water pump 542 may be controlled by one or more field controllers (e.g., field controllers 510-514). For example, field controllers 510-514 may be configured to receive control signals from a master controller and transmit control signals to connected devices (e.g., cooling tower 538, chilled water pump 540, and condenser water pump 542). In some embodiments, the connected devices also include isolation valves.

In various embodiments, chillers 502-508, cooling tower 538, chilled water pump 540, and condenser water pump 542 may be connected to wireless network 544 via a wired connection to a smart communicating access point (SC-AP) (e.g., SC-AP 516-528). In some embodiments, field controllers 510-514 may communicate with SC-APs 524-528 via a master-slave token passing (MSTP) protocol. In some embodiments, the SC-AP is a Mobile Access Portal (MAP) device manufactured by Johnson Controls, Inc. Further details of the MAP device may be found in U.S. patent application Ser. No. 15/261,843 filed Sep. 9, 2016. The entire disclosure of U.S. patent application Ser. No. 15/261,843 is incorporated by reference herein.

Wireless network 544 may enable devices (e.g., chillers 502-508, cooling tower 538, chilled water pump 540, and condenser water pump 542) to communicate with each on a communications bus using any suitable communications protocol (e.g., WiFi, Bluetooth, ZigBee). SC-AP 516-528 may also enable devices to communicate wirelessly via network 530 with connected services 532. In various embodiments, connected services 532 may include a variety of cloud services, remote databases, and remote devices used to configure, control, and view various aspects of CPOS 500. For example, connected services 532 may include a mobile device or a laptop configured to display configuration parameters of CPOS 500 and receive user input regarding the configuration parameters.

In some embodiments, connected services 532 includes configuration database 534. In various embodiments, configuration database 534 may be hosted in a secure web server that permits secure remote access through an internet connection. Configuration database 534 may be configured to store various HVAC device operating parameters (see tables 800-1100 with reference to FIGS. 8-11 below) that correspond to device identification codes. In some embodiments, configuration database 534 may be queried by a controller via a message containing device identification codes. In response, configuration database 534 may retrieve and transmit device operating parameters to the controller. Further details of this process are provided below with reference to FIG. 7.

Still referring to FIG. 5, each of the chillers 502-508 is shown to include a display panel 550-556 and a processing circuit 558-564. The display panels 550-556 may be configured to display information to a user regarding the current status of CPOS 500. In some embodiments, display panels 550-556 are also configured to receive user input (e.g., via an attached keypad, touchscreen, etc.). For example, in some embodiments, display panels 550-556 are identical or substantially similar to electronic display 594, described above with reference to FIG. 5A.

Each chiller processing circuit 558-564 may contain a processor 566-572 and memory 574-580. Processors 566-572 can be implemented as general purpose processors, application specific integrated circuits (ASICs), one or more field programmable gate arrays (FPGAs), a group of processing components, or other suitable electronic processing components. Memory 574-580 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 574-580 can be or include volatile memory or non-volatile memory. Memory 574-580 may include object code components, script components, or any other type of information structure for supporting the various activities and information structures described in the present application. According to some embodiments, memory 574-580 is communicably connected to processors 566-572 via processing circuit 558-564 and includes computer code for executing (e.g., by processing circuits 558-564 and/or processors 566-572) one or more processes described herein.

Figure 6:
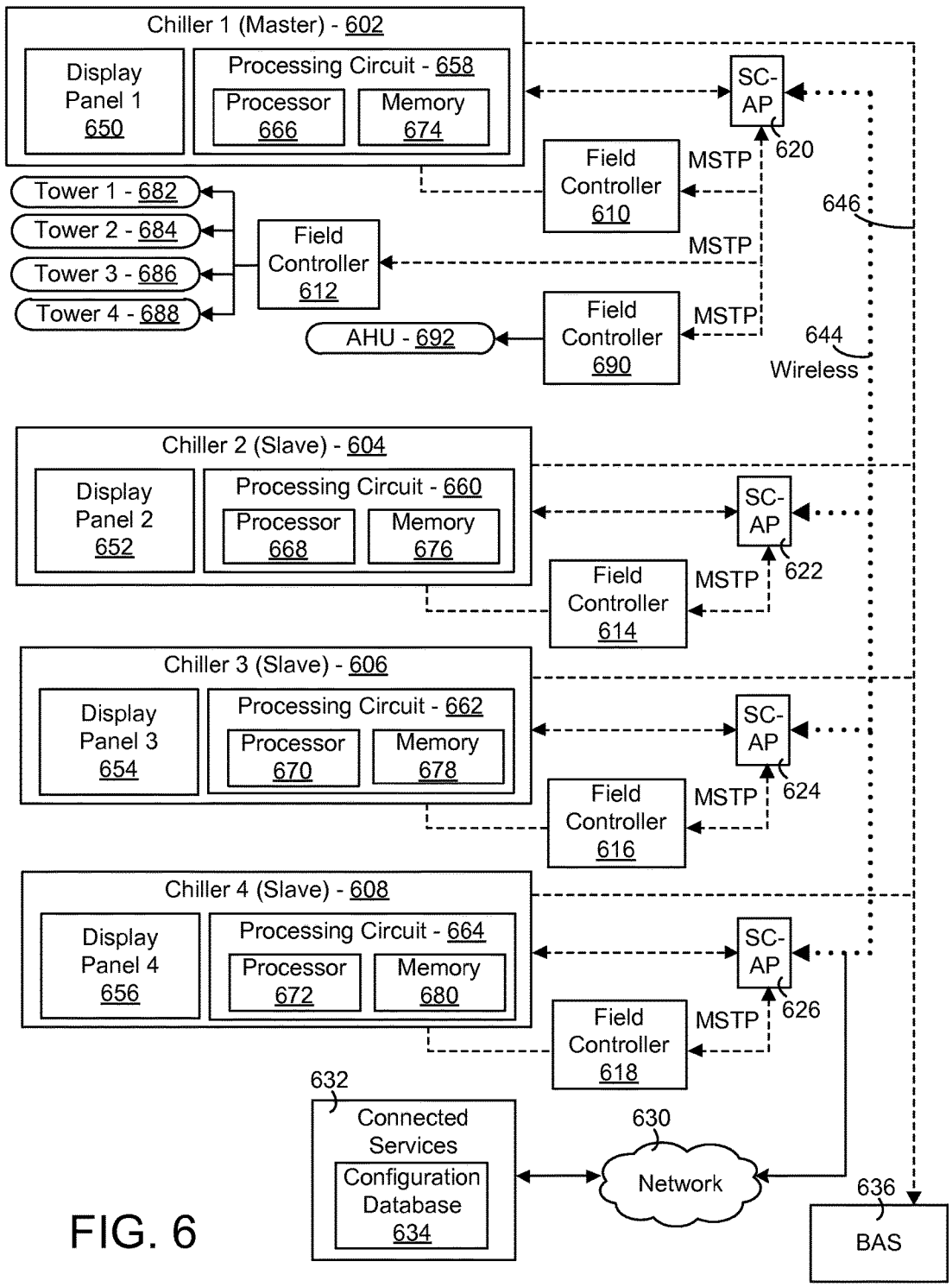
FIG. 6 is another block diagram of a central plant optimization system that can be implemented in the HVAC system of FIG. 1, according to some embodiments.

Referring now to FIG. 6, an alternative configuration central plant optimization system (CPOS) 600 is depicted, according to some embodiments. As shown, CPOS 600 includes multiple chillers 602-608. Each of the chillers is shown to include a display panel 650-656 and a processing circuit 658-664 with processors 666-672 and memory 674-680. In some embodiments, chillers 602-608 are identical or substantially similar to chillers 502-508 described above with reference to FIG. 5. Chillers 602-608 may communicate with BAS 636 via network 646. In some embodiments, BAS 636 is identical or substantially similar to BAS controller 366 described above with reference to FIG. 4.

Each of the chillers 602-608 is shown to communicate wirelessly (e.g., with each other, or with connected services 632 via network 630 and wireless network 644) via connections to access points 620-626. Connected services 632 is shown to include a configuration database 634. In contrast to FIG. 5, each of the chiller devices 602-608 may be connected to an additional field controller 610-618. In some embodiments, field controllers 610-618 may be configured to provide additional control functionality to chiller devices 602-608. In other embodiments, field controllers 610-618 may control other HVAC devices. For example, field controller 612 is shown to be communicably coupled to cooling tower devices 682-688, and field controller 690 is shown to be communicably coupled to air handling unit (AHU) 692. In various embodiments, field controllers 610-618 may be communicably coupled to SC-APs 620-626, and may be configured to transmit and receive messages via MSTP protocols.

Figure 7:
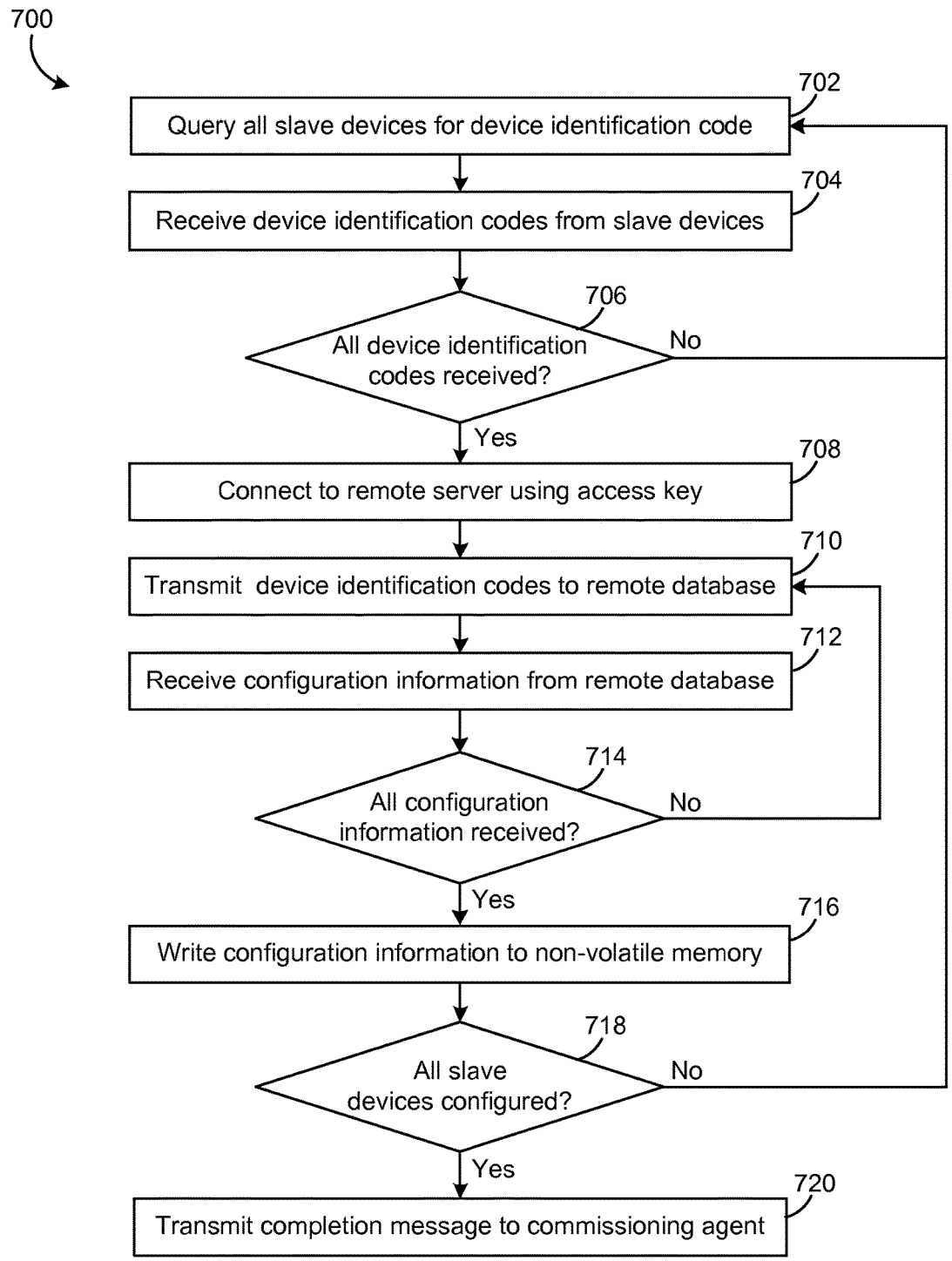
FIG. 7 is a flow diagram illustrating a remote server query technique which can be used by a master controller of FIGS. 5-6 to automatically commission and configure slave devices, according to some embodiments.

Referring now to FIG. 7, a flow diagram of a process 700 to automatically commission and configure slave devices is depicted, according to some embodiments. Process 700 may be performed by a device designated as the "master" device within central plant optimization system 500 or 600. (For the purposes of simplicity, process 700 below will only be described with reference to system 500.) Details of the process by which a device is designated and configured to operate as the master device are included below with reference to FIG. 12.

Process 700 may commence with step 702, in which the designated master device (e.g., chiller 502) queries the designated slave devices (e.g., chillers 504-508, field controllers 510-514) connected to the wireless network 544 for a device identification code. In some embodiments, the master device queries each slave device sequentially. In other embodiments, the master device sends a batch query to all connected slave devices. The device identification code may be a serial number, a model number, a device ID number, a MAC address, a product number, a series of identification dip switches, or any other unique identifier for the device that may be configured to retrieve device information from a remote database. At step 704, the master device receives messages containing device identification codes from the slave devices. At step 706, the designated master device determines whether each of the slave devices has transmitted its device identification code. If the master device has received a device identification code from each slave device, process 700 continues to step 708. If the master device has not received a device identification code from each slave device, process 700 reverts to step 702, and the master device may re-query the slave devices. In some embodiments, the master device may only transmit the query message to slave devices for which the master device has not received a device identification code.

Continuing with step 708 of the process 700, the master device may connect to a remote server using an access key. For example, the remote server may be configuration database 534 within connected services 532. The access key may be any type of code or password configured to permit the master device to access a remote server. In some embodiments, the access key is stored in the memory (e.g., memory 574) of the master device processing circuit. At step 710, the master device may transmit the device identification codes received in step 704 from the slave devices to the remote server. The remote server may then use the device identification codes to search the contents of the remote server (e.g., configuration database 534) to retrieve configuration information (e.g., device parameters, device settings, device control files) corresponding to the device identification codes.

At step 712, the master device (e.g., chiller 502) may receive the configuration information from the remote server (e.g., configuration database 534) via one or more networks (e.g., network 530 and/or wireless network 544). At step 714, the master device determines whether the remote server has transmitted configuration information for each slave device. If the master device determines that some configuration information is missing, process 700 may revert to step 710, and the master device may re-transmit device identification codes to the remote server. If the master device determines that all configuration information has been received, process 700 continues to step 716. At step 716, the master device may write the configuration information for each slave device to non-volatile memory (e.g., memory 574).

Continuing with step 718, the master device may determine whether configuration information has been received for each slave device in communication with the master device. If the master device determines that configuration information is missing for some connected slave devices, process 700 may revert to step 702, and the master device may transmit another message querying connected slave devices for a device identification code. In some embodiments, the master device may only transmit the query message to slave devices for which the master device has not received configuration information.

Still referring to FIG. 7 and returning to step 718, if the master device determines configuration information has been received for all slave devices, process 700 may conclude at step 720, in which the master device may transmit a completion message to a commissioning agent (e.g., a user). For example, chiller 502 may display a message on display panel 550 indicating that all devices connected to CPOS 500 have been successfully configured. If the master device has failed to receive configuration information for any connected slave device (e.g., if the slave device fails to return a device identification code to the master, or if the remote server fails to match configuration information to the device identification code), the master device may transmit a message to commissioning agent informing the agent of the missing information. For example, chiller 502 may display a message on display panel 550 prompting a user to input the missing configuration information manually.

Turning now to FIGS. 8-11, tables of configuration parameters for several components of HVAC system 100 are shown, according to some embodiments. In some embodiments, these configuration parameters may be stored in a remote server (e.g., configuration database 534) and transmitted to a master device (e.g., chiller 502) as described above in step 710 of process 700. In other embodiments, these parameters may be entered by a user manually via the user interface of a master device (e.g., display panel 550, display panel 650). For example, FIG. 8 depicts configuration parameters of chiller devices. In some embodiments, these chillers are identical or substantially similar to chillers 502-508 of system 500, or chillers 602-608 of system 600, described above with reference to FIGS. 5-6. As shown in FIG. 8, table 800 includes multiple chiller parameter columns 804-810 such that different parameters may be stored for different devices. For example chiller column 804 may correspond to the configuration parameters for chiller device 502, while chiller column 810 may correspond to the configuration parameters for chiller device 508. Chiller parameters may be identified in column 802 and may include, but are not limited to: rated power, rated condenser water flow, rated chilled water flow, rated capacity, maximum and minimum percent load, number of tubes, shell length, inside tube diameter, and fluid type.

Referring now to FIG. 9, a table illustrating the configuration parameters of cooling towers implemented in the central plant optimization systems 500 and 600 is shown, according to some embodiments. Table 900 depicts multiple cooling tower parameter columns 904, 906, 908, and 910 (e.g., tower column 904 may correspond to the configuration parameters for tower 682, tower column 910 may correspond to the configuration parameters for tower 688). Tower parameters may be identified in column 902 and may include, but are not limited to: rated water flow capacity, rated power, rated fan capacity, and rated fan speed.

Turning now to FIG. 10, a table illustrating the configuration parameters of chilled water pumps (e.g., chilled water pump 540) is shown, according to some embodiments. Table 1000 depicts multiple chilled water pump parameter columns 1004-1010, as well as the parameters identified in column 1002. Chilled water pump parameters identified in column 1002 may include, but are not limited to: rated capacity, rated power, and rated speed.

Finally, FIG. 11 is a table illustrating the configuration parameters of an air handling unit (AHU) implemented in the central plant optimization systems of FIGS. 5-6, according to some embodiments. As shown in table 1100, AHU parameters identified in column 1102 and stored in column 1104 may include, but are not limited to: rated AHU capacity, rated compressor power, rated AHU fan capacity and power, design supply air temperature and flow, rated AHU airflow pressure drop, and rated condenser fan capacity and power. In other embodiments, table 1100 may display configuration parameters for a rooftop air handling unit (RTU) or a variable air volume (VAV) device.

Dynamic Master Controller Selection

Figure 12:
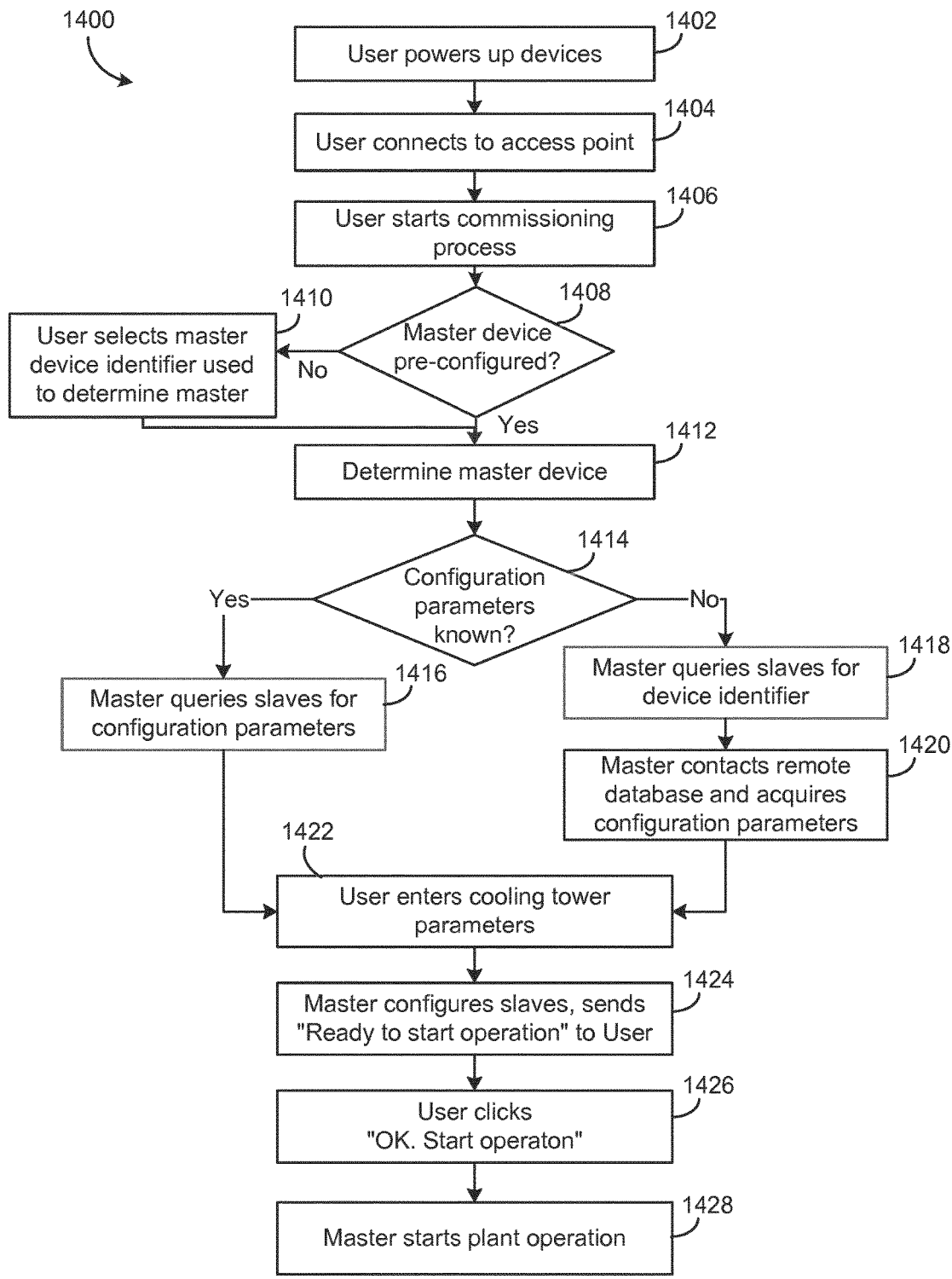
FIG. 12 is a flow diagram illustrating a technique to determine a master controller and utilize the master controller to configure slave devices, according to some embodiments.

Referring now to FIG. 12, a flow diagram of a process 1400 for determining a master controller and utilizing the master controller to configure slave devices is shown, according to some embodiments. Determination of a master controller may be useful in a central plant optimization system because the master controller may be configured to retrieve configuration information for slave devices (see above description of process 700 with reference to FIG. 7) and to operate the slave devices once configuration information is received. The master controller may also be configured to display properties of the central plant system and to receive configuration and control input from users via a user interface. In various embodiments, process 1400 may be performed by any or all components of the central plant optimization systems 500 and 600, described above with reference to FIGS. 5-6. For the purpose of simplicity, process 1400 will be described exclusively below with reference to CPOS 500.

Process 1400 may commence with step 1402, in which a user wishing to commission a system (e.g., CPOS 500) powers up all devices within the system (e.g., chillers 502-508, SC-APS 516-528, field controllers 510-514, cooling tower 538, chilled water pump 540, condenser water pump 542). At step 1404, the user may connect to an access point. In some embodiments, the access point is a chiller display panel (e.g., CPOS display panels 550-556). At step 1406, the user may begin a commissioning process. Continuing with step 1408, the system detects whether one of the components in the system has been pre-configured as the master device. If so, process 1400 may proceed to step 1412.

If the system does not include a pre-configured master device, at step 1410, the user may select a master device identifier used to determine the master controller. For example, the master device identifier may be a serial number, a MAC address, a product number, a series of identification dip switches, or an IP address. In other embodiments, the master device identifier may be a text string input from the user (e.g., "Chiller_1," "Chiller_A"). In some embodiments, the master device identifier used to determine the master controller is the same device identifier (e.g., serial number, model number, device ID number) used to retrieve configuration information from a remote server in process 700 described above with reference to FIG. 7. In other embodiments, the device identifiers are not the same.

Step 1410 may further include the user selecting a rule hierarchy for the master device identifiers. For example, if the master device identifiers are numbers, the user may select a rule that designates the device with either the highest or lowest number master device identifier as the master device. As another example, if the master device identifiers are text strings, the user may select a rule that designates the device with either the first or last alphabetical master device identifier as the master device. In some embodiments, the rule selected by the user will be transmitted to all connected devices. In various embodiments, the rule forms part of an algorithm used to determine the master device.

Still referring to FIG. 12, process 1400 may continue with step 1412, in which the master device may be determined either via a pre-configured status detected in step 1408 or via an algorithm and the master device identifier rule selected by the user in step 1410. For example, step 1412 may include the devices communicating with each other via messages that include each device's master device identifier. Once each device has communicated its master device identifier, the algorithm may compare each of the identifiers to determine the master device. For example, in various embodiments, the algorithm may determine that the device with the lowest serial number or the first user identifier alphabetically should become the master device. Once a master device is identified, all other devices may default to a slave device identity. In some embodiments, when a device assumes a master or slave identity, a configuration parameter reflecting this identity may be stored in the device (e.g., in memory 574-580).

In step 1414, the master controller (e.g., chiller 502) assumes control of the system (e.g., CPOS 500) and determines whether configuration information for the slave devices is stored (e.g., in memory 576-580) on the slave devices. If so, process 1400 may proceed to step 1416, and master controller may send query messages to the slave devices prompting the slave devices to transmit the configuration information to the master controller. However, if the master controller determines that configuration information for the slave devices is not known, process 1400 may proceed from step 1414 to step 1418, in which the master controller queries the slave devices for device identifiers. At step 1420, the master controller may transmit the slave device identifiers to a remote database (e.g., configuration database 534) which may, in turn, return slave device configuration information (e.g., configuration parameters, described above with reference to FIGS. 8-11) to the master controller. In some embodiments, steps 1418 and 1420 are substantially similar to process 700, described above with reference to FIG. 7.

At step 1422, the user may manually enter configuration parameters for the cooling towers into a user interface of the master controller (e.g., display panel 550). In some embodiments, the cooling tower configuration parameters are identical or substantially similar to the cooling tower parameters presented in table 900 with reference to FIG. 9. Once the master controller has received configuration information (e.g., configuration parameters) for all slave devices, the master controller may use the configuration information to commission the slave devices at step 1424. For example, in some embodiments, master controller may prompt the slave devices to write the configuration information to internal memory (e.g., memory 576-580).

Step 1424 may further include the master controller transmitting a message to the user that CPOS 500 has completed a commissioning process. For example, chiller 502 may display a "Ready to start operation" message on display panel 550. Upon receipt of the commissioning completion message, at step 1426 the user may transmit a command to CPOS 500 authorizing the start of operations. For example, the user may click an "OK. Start Operation" button on display panel 550. Process 1400 then concludes at step 1428, in which master controller begins operation of CPOS 500.

Configuration of Exemplary Embodiments

The construction and arrangement of the systems and methods as shown in the various exemplary embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
   a communications bus;
   a plurality of slave devices connected to the communications bus;
   a remote server comprising a slave device configuration database; and
   a master controller connected to the communications bus and configured to:
   query the plurality of slave devices for device identification codes;
   receive the device identification codes from the plurality of slave devices;
   connect to the remote server;
   transmit the device identification codes to the slave device configuration database;
   receive slave device configuration information from the slave device configuration database, the slave device configuration information comprising at least one of cooling tower configuration parameters, chilled water pump configuration parameters, condenser water pump configuration parameters, air handling unit configuration parameters, rooftop air handling unit configuration parameters, variable air volume unit configuration parameters, and chiller device configuration parameters, and further comprising at least one of a rated device capacity, a rated device power, and a rated device speed; and
   control the plurality of slave devices based at least in part on the slave device configuration information.

2. The building management system of claim 1, wherein the device identification codes comprise at least one of a device serial number, a device model number, a device MAC address, a device product number, device identification dip switches, and a device ID number.

3. The building management system of claim 1, wherein the plurality of slave devices comprise at least one of a chiller device and a field controller.

4. The building management system of claim 1, wherein the master controller is further configured to write the slave device configuration information to non-volatile memory.

5. The building management system of claim 1, wherein the chiller device configuration parameters comprise at least one of the rated device power, a rated chilled water flow, a rated condenser water flow, a maximum chilled water flow, a minimum chilled water flow, a maximum condenser water flow, a minimum condenser water flow, and a fluid type.

6. The building management system of claim 1, wherein the master controller is further configured to:
   determine whether the slave device configuration information has been received for each of the plurality of slave devices; and
   transmit a completion message to a commissioning agent.

7. A method for commissioning a plurality of slave devices by a master controller in a building management system, the method comprising:
   querying the plurality of slave devices connected to a communications bus of the building management system;
   receiving device identification codes from the plurality of slave devices;
   connecting to a remote server, the remote server comprising a slave device configuration database;
   transmitting the device identification codes to the slave device configuration database;
   receiving slave device configuration information from the slave device configuration database, the slave device configuration information comprising at least one of cooling tower configuration parameters, chilled water pump configuration parameters, condenser water pump configuration parameters, air handling unit configuration parameters, rooftop air handling unit configuration parameters, variable air volume unit configuration parameters, and chiller device configuration parameters, and further comprising at least one of a rated device capacity, a rated device power, and a rated device speed; and controlling the plurality of slave devices based at least in part on the slave device configuration information.

8. The method of claim 7, wherein the device identification codes comprise at least one of a device serial number, a device model number, a device MAC address, a device product number, device identification dip switches, and a device ID number.

9. The method of claim 7, wherein the plurality of slave devices comprise at least one of a chiller device and a field controller.

10. The method of claim 7, wherein the method further comprises writing slave device configuration information to non-volatile memory.

11. The method of claim 7, wherein the chiller device configuration parameters comprise at least one of the rated device power, a rated chilled water flow, a rated condenser water flow, a maximum chilled water flow, a minimum chilled water flow, a maximum condenser water flow, a minimum condenser water flow, and a fluid type.

12. The method of claim 7, wherein the method further comprises:
   determining whether the slave device configuration information has been received for each of the plurality of slave devices; and
   transmitting a completion message to a commissioning agent.

13. A method for commissioning HVAC devices in a building management system, the method comprising:
   querying, by a designated master device, a plurality of designated slave devices connected to a communications bus of the building management system;
   receiving, by the designated master device, device identification codes from the plurality of designated slave devices, wherein the device identification codes comprise at least one of a serial number, a model number, a MAC address, a product number, identification dip switches, and an ID number;
   connecting, by the designated master device, to a remote database comprising device configuration parameters;
   transmitting, by the designated master device, the device identification codes to the remote database;
   receiving, by the designated master device, device configuration parameters from the remote database corresponding to the device identification codes, the device configuration parameters comprising at least one of cooling tower configuration parameters, chilled water pump configuration parameters, condenser water pump configuration parameters, air handling unit configuration parameters, rooftop air handling unit configuration parameters, variable air volume unit configuration parameters, and chiller device configuration parameters; and
   configuring, by the designated master device, the plurality of designated slave devices using the device configuration parameters;
   determining, by the designated master device, whether the device configuration parameters have been received for each of the plurality of designated slave devices; and
   transmitting, by the designated master device, a completion message to a commissioning agent.

14. The method of claim 13, wherein the designated master device comprises non-volatile memory and wherein configuring the plurality of designated slave devices using the device configuration parameters comprises writing the device configuration parameters to the non-volatile memory of the designated master device.

15. A building management system comprising:
   a communications bus;
   a plurality of slave devices connected to the communications bus;
   a remote server comprising a slave device configuration database; and
   a master controller connected to the communications bus and configured to:
      query the plurality of slave devices for device identification codes;
      receive the device identification codes from the plurality of slave devices;
      connect to the remote server;
      transmit the device identification codes to the slave device configuration database;
      receive slave device configuration information from the slave device configuration database;
      control the plurality of slave devices based at least in part on the slave device configuration information;
      determine whether the slave device configuration information has been received for each of the plurality of slave devices; and
      transmit a completion message to a commissioning agent.

16. The building management system of claim 15, wherein the slave device configuration information comprises at least one of cooling tower configuration parameters, chilled water pump configuration parameters, condenser water pump configuration parameters, air handling unit configuration parameters, rooftop air handling unit configuration parameters, variable air volume unit configuration parameters, and chiller device configuration parameters;
   the chiller device configuration parameters comprising at least one of a rated device power, a rated chilled water flow, a rated condenser water flow, a maximum chilled water flow, a minimum chilled water flow, a maximum condenser water flow, a minimum condenser water flow, and a fluid type.

17. A method for commissioning a plurality of slave devices by a master controller in a building management system, the method comprising:
   querying the plurality of slave devices connected to a communications bus of the building management system;
   receiving device identification codes from the plurality of slave devices;
   connecting to a remote server, the remote server comprising a slave device configuration database;
   transmitting the device identification codes to the slave device configuration database;
   receiving slave device configuration information from the slave device configuration database;
   controlling the plurality of slave devices based at least in part on the slave device configuration information;

determining whether the slave device configuration information has been received for each of the plurality of slave devices; and transmitting a completion message to a commissioning agent.

18. The method of claim 17, wherein the slave device configuration information comprises at least one of cooling tower configuration parameters, chilled water pump configuration parameters, condenser water pump configuration parameters, air handling unit configuration parameters, rooftop air handling unit configuration parameters, variable air volume unit configuration parameters, and chiller device configuration parameters;

the chiller device configuration parameters comprising at least one of a rated device power, a rated chilled water flow, a rated condenser water flow, a maximum chilled water flow, a minimum chilled water flow, a maximum condenser water flow, a minimum condenser water flow, and a fluid type.

* * * * *